US008606783B2

(12) United States Patent  
Srikrishna et al.

(10) Patent No.: US 8,606,783 B2  
(45) Date of Patent: Dec. 10, 2013

(54) IDENTIFYING VIDEO FILES OF A VIDEO FILE STORAGE SYSTEM HAVING RELEVANCE TO A FIRST FILE

(75) Inventors: Devabhaktuni Srikrishna, San Francisco, CA (US); Marc A. Coram, Stanford, CA (US); Christopher Hogan, San Mateo, CA (US)

(73) Assignee: Python4Fun, Inc., San Mateo, CA (US)

( * ) Notice: Subject to any disclaimer, the term of this patent is extended or adjusted under 35 U.S.C. 154(b) by 0 days.

(21) Appl. No.: 13/438,358

(22) Filed: Apr. 3, 2012

(65) Prior Publication Data

US 2013/0262462 A1 Oct. 3, 2013

(51) Int. Cl.
*G06F 17/30* (2006.01)

(52) U.S. Cl.
USPC .......................................... 707/736

(58) Field of Classification Search
USPC .......... 707/5, 734, 736; 715/234, 513; 725/38
See application file for complete search history.

(56) References Cited

U.S. PATENT DOCUMENTS

| | | | | |
|---|---|---|---|---|
| 5,752,020 | A * | 5/1998 | Ando | 1/1 |
| 6,327,590 | B1 * | 12/2001 | Chidlovskii et al. | 707/734 |
| 6,981,210 | B2 * | 12/2005 | Peters et al. | 715/234 |
| 7,707,808 | B2 | 4/2010 | Schmelzer | |
| 2004/0117732 | A1 * | 6/2004 | McNeill et al. | 715/513 |
| 2005/0216429 | A1 | 9/2005 | Hertz et al. | |
| 2006/0271561 | A1 | 11/2006 | Schlachta-Fairchild et al. | |
| 2007/0288455 | A1 | 12/2007 | Hsu | |
| 2008/0109808 | A1 | 5/2008 | Wing et al. | |
| 2009/0265737 | A1 * | 10/2009 | Issa et al. | 725/38 |
| 2009/0292685 | A1 * | 11/2009 | Liu et al. | 707/5 |
| 2010/0145958 | A1 | 6/2010 | Duffy et al. | |
| 2011/0035674 | A1 | 2/2011 | Chenoweth et al. | |
| 2011/0096014 | A1 | 4/2011 | Fuyuno et al. | |
| 2012/0066201 | A1 | 3/2012 | Suman et al. | |
| 2012/0078945 | A1 | 3/2012 | Hurst | |
| 2012/0084629 | A1 | 4/2012 | Patrawala et al. | |
| 2012/0158747 | A1 | 6/2012 | Satow et al. | |
| 2012/0221687 | A1 | 8/2012 | Hunter et al. | |
| 2012/0233151 | A1 | 9/2012 | Vanderwende et al. | |

OTHER PUBLICATIONS

Response to Office Action Dated Jun. 11, 2013; U.S. Appl. No. 13/438,225, filed Apr. 3, 2012.
Response to Office Action Dated Jun. 27, 2013; U.S. Appl. No. 13/438,266, filed Apr. 3, 2012.
Response to Office Action Dated Jul. 16, 2013; U.S. Appl. No. 13/438,251, filed Apr. 3, 2012.
Office Action Dated Sep. 20, 2013 for U.S. Appl. No. 13/438,386.
Office Action Dated Aug. 29, 2013 for U.S. Appl. No. 13/438,322.

* cited by examiner

*Primary Examiner* — Etienne Leroux
(74) *Attorney, Agent, or Firm* — Brian R. Short

(57) ABSTRACT

Methods and systems for providing related video files in a video file storage system are disclosed. One method includes identifying a plurality of video files within the video file storage system, wherein the plurality of video files each have a relationship with the first file, and each video file includes a video and associated information. The method further includes generating, by a system server, a list of inquiries based on the plurality of video files, providing, by the system server, the list of inquiries to at least one creator of the first file, receiving from the at least one creator at least one response to the list of inquiries, selecting a subset of the plurality of video files based on the at least one response, and storing information related to the selected subset of the plurality of video files.

39 Claims, 9 Drawing Sheets

200

Are any of the following updates to World Wide Web relevant to your paper? (i.e. Chronic Obstructive Pulmonary Disease : Effects beyond the Lungs) 208

● Yes, some of them are relevant 204  ◎ No, none of them are relevant 206

Check all that apply – if checked use the text box below them to explain why it is related Microalbuminuria and hypoxemia in patients with chronic obstructive pulmonary disease.(2010 Oct 15 PubMed)Found using (Celli) AND ("stable patients") - Albert Einstein, Professor of Physics, Princeton University, albert.einstein@princeton.edu, 113 Market St. Princeton, NJ 218

[X] Relevant systemic effect

Addressing the complexity of chronic obstructive pulmonary disease: from phenotypes and biomarkers to scale-free networks, systems biology, and P4 medicine. (2011 May 1 PubMed) Found using ("celli") AND ("Review obstructive pulmonary")- Oppenheimer, Professor of Physics, 212 oppenheimer@ucberkeley.edu, University of California, 145 Main Street, Berkeley 220

216 Directly Relevant

[ ] Involvement of endothelial apoptosis underlying chronic obstructive pulmonary disease-like phenotype in adiponectin-null mice: implications of therapy. (2011 May 1 PubMed)Found ("link between COPD") AND ("systematic inflammation")-William Shockley, Professor of Physics, william.shockley@mit.edu, Massachusetts Institute of Technology, 444 El Camino Real, Cambridge, MA.

210

[X] Comparison of biomarkers of subclinical lung injury in obstructive sleep apnea. (2010 Jul 11 PubMed)Found using ("lung-specific biomarker")-Albert Einstein, Professor of Physics, Princeton University, albert.einstein@princeton.edu, 113 Market St. Princeton, NJ

214

[ ] The link between periodontal disease and cardiovascular disease: How far we have come in the last two decades? (2010 Jul 11 PubMed)Found using ("link between COPD") AND ("Review 222 obstructive pulmonary")-William Shockley, Professor of Physics, william.shockley@mit.edu, Massachusetts Institute of Technology, 444 El Camino Real, Cambridge, MA

IDENTIFYING VIDEO FILES OF A VIDEO FILE STORAGE SYSTEM HAVING RELEVANCE TO A FIRST FILE

FIELD OF EMBODIMENTS

The described embodiments relate generally to search results. More particularly, the described embodiments relate to methods, and systems for identifying video files of a video file storage system having relevance to a first file.

BACKGROUND

Search engines running on video file storage systems use a variety of search techniques to present individual videos or video files or files embedded with video to users based on one or more search terms that are provided by the users. The relevance of search results relate closely to the search terms, creators, or date created. The search engine generally produces a large number of results with videos that include some irrelevant results and are difficult to sort for relevant videos or video files. Many suggested videos are not relevant to the user. Relevant results are not always provided.

It is desirable to have methods and systems for providing a list of videos related to the selected video, relevant to the subject matter of the selected video.

SUMMARY

One embodiment includes a method of automatically identifying one or more videos in a video file storage system related to a first file. The method includes identifying a plurality of video files within the video file storage system, wherein the plurality of video files each have a relationship with the first file, wherein the video file storage system provides a platform for storing and sharing videos, and each video file includes a video and associated information. The method further includes generating, by a system server, a list of inquiries based on the plurality of video files, providing, by the system server, the list of inquiries to at least one creator of the first file, receiving from the at least one creator at least one response to the list of inquiries, selecting a subset of the plurality of video files based on the at least one response, and storing information related to the selected subset of the plurality of video files for access if the first file is selected.

Another embodiment includes providing the list of enquiries to more than one creator. In another embodiment, a different list of inquiries is provided to a first creator and other creators. The identified video files are ranked based on the responses from all the creators and a subset of video files is selected.

Other aspects and advantages of the described embodiments will become apparent from the following detailed description, taken in conjunction with the accompanying drawings, illustrating by way of example the principles of the described embodiments.

BRIEF DESCRIPTION OF DRAWINGS

In the following figures like reference numbers are used to refer to like elements. Although the following figures depict various examples, the one or more implementations are not limited to the examples depicted in the figures.

FIG. 2 shows an example list of inquiries presented to the creators.

DETAILED DESCRIPTION

The described embodiments are embodied in methods, and systems for providing a set of video files to a user in a video file storage system, where the set of video files have relevance to the first file from a search or retrieval of a record identifying the first file.

Figure 1:
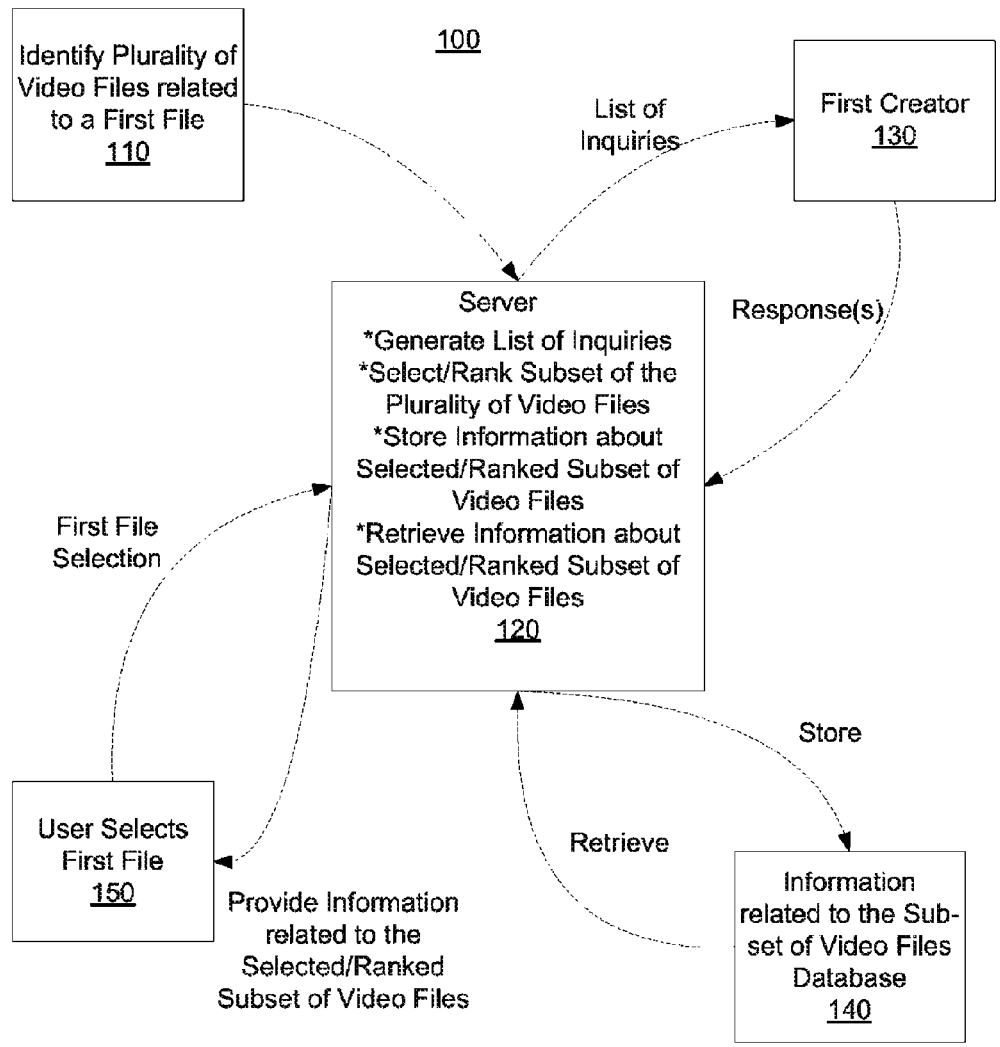
FIG. 1 is a block diagram of an embodiment of a system of providing related video files from a video file storage system, where a creator provides input to selecting/ranking a subset of video files.

FIG. 1 is a block diagram of an embodiment of system 100, a system of providing related video files from a video file storage system, where a creator is involved in selecting/ranking a subset of video files. In the described embodiments, video and video file may be interchanged to refer to a file in any video format or any type of file with embedded moving pictures or videos. For at least some embodiments, the video file storage system provides a platform for storing and sharing videos, and each video file includes a video and associated information. For at least one embodiment, the associated information includes at least metadata. Users can send video files and share the video files. In an embodiment, the shared video files have viewers or creators. Youtube®, Vimeo®, Hulu®, and Netflix® are all examples of video file storage systems, each storing video files or video streams addressable at hyperlinks on the World Wide Web. The video file storage system is accessible by the members of a group or users on the World Wide Web. In an embodiment, any user may edit a video file. In several embodiments, a first file is a video file in the video file storage system, or on the disk drive of the user system, or a file on the internet, or a shared on a social network such as Twitter® or Facebook®, a file whose URL was shared by the user on a social network such as Twitter® or Facebook®, or a conversation or message on a social network, an email message or thread. In several embodiments, the first file may be a recently added video file to the video file storage system, or identified due a large number of video files added to the video file storage system in the same subject matter, or identified automatically for a periodic update of related video files, or identified by any other method. It is to be understood that for various embodiments, the first file includes at least one of a web page, a document, an article, a social profile, a message, a message thread, a conversation, a video file, an audio file, or a picture file. It is also to be understood that this is not an exhaustive list.

The video file storage system is updated constantly as users add video files to the video file storage system. As the number of video files grows large, existence of the video file may not be known to many users if relevant hyperlinks to other video files are not created. Creating hyperlinks is a manual task and often few video files are hyperlinked together in a video file storage system. Search engines provide access to the video files that are not hyperlinked.

Unlike machine generated references using an algorithm running on a computer, the judgment of creators in selecting related video files is valuable to other readers due to the creator's intrinsic understanding and motivation to identify materials related to the video file written by that creator. In general, a creator or expert has greater interest and more precise understanding of the subject matter of what they wrote in their video file compared to other readers. In several embodiments, a creator may be any of a creator of the video file, a director, a narrator, a transcript creator, a sound technician, a music director, an expert on the subject matter or a team member, anyone who has write-privilege to the first file, or anyone who posts the file on a social network newsfeed.

Search engines list related video files that are published before or after a file has been published. When a file is selected from the search results, a set of related video files may be presented by the search engine. The set of related video files are based on some criteria such as the number of hyperlinks a video file has, common subject matter, and the frequency of certain phrases in the meta-data or text-transcription of the video file. The number of hyperlinks is one of the criteria for search engines to list a video file at the top of the related video files. If a video file has no hyperlinks, the search engine may not list a video file at the top though the video file may be relevant. The criteria for suggesting a list of related video files can be improved by using an expert or creator to recommend the video files through hyperlinks. The process of semi-automating the presentation of a list of related video files is described in the embodiments.

A set of video files related to the first file is identified in video file storage system 110 by server 120. In one embodiment, identifying in video file storage system 110 includes server 120 identifying a set of video files related to the first file and receiving the list of identified video files. In another embodiment, identifying in video file storage system 110 includes server 120 receiving the list of identified video files. In several embodiments, the set of identified video files 110 can be the output of natural language search or text analysis on the meta-data or text-transcript of the video file, or from collaborative filtering, or any other search technique. In several embodiments, the search can be based on a string of words, or a picture or a creator. The set of video files is derived based on a relationship with the first file. The relationship can be any one of or some of creator of the first file, frequently used noun phrases in the meta-data or text-transcript of the video file, date created later than the first file, a specific date created, or a date created after a specific date. Video files published from a creator tend to have common subject matter. Frequently used noun-phrases in the first file are also keywords for searching related video files. However, the occurrence of specific noun phrases in the video file storage system may change with technology or over a period of time. Many search engines may not have the intelligence to recognize the changing noun phrases over a period of time. In some embodiments, the full-text of the meta-data or transcript is used for searching to yield more relevant related video files. Video files with date created later than the first file are valuable as users are generally interested in recent updates.

In an example, a search engine operating on server 120 uses the Google Data API to identify related video files in Youtube®, based on noun phrases in video file meta data and text-transcript of the video file. Youtube® is a free video file storage and transmission system. Google Data API® is a powerful application-programming interface that allows users to search for video files on Youtube®. The algorithm used to generate the search terms automatically extracts noun phrases from a video file using natural language processing tools and ranks them by the number of occurrences in the video file meta-data compared to the number of occurrences on the video file storage system.

Server 120 generates a list of inquiries based on the set of video files related to the first file. In an embodiment, the list of inquiries includes questions asking the creator whether the video files are relevant to the first file, and the search terms used in keyword search or noun-phrase used to select the video file.

FIG. 2 shows example 200, an inquiry generated using keyword search by Google Data® API in Youtube®. Selection of keyword search results displays related video files. Example 200 shows the related video files from keyword searches. In example 200, 202 is the subject of the first file. The first question summarizes the inquiry about relevant video files. 204 is a check box next to a related video file selected by a search engine. 206 is the date created of the related video file. 208 is the search term used to identify the related video file. 210 is an input box for the creator to enter the reason for the video file being relevant. 212 shows the author who selected the profile as relevant. 214 shows the institution of the author. 216 shows the relationship tag, 218 shows the email address of the author, 220 shows the address and 222 shows the affiliation of the author. In one embodiment, the identity of the senders who selected each message thread is revealed to the user by displaying meta-data such as the sender's name, address, or contact information.

For an embodiment, referring back to FIG. 1, a first creator 130 is notified of the list of inquiries generated by server 120. In the described embodiments, a first creator is the creator of the first file, an expert on the subject matter or a team member or anyone who has write-privilege to the first file. In the described embodiments, the notification can be sent electronically. In an embodiment, the notification email contains a hyperlink to a webpage that contains the list of inquiries. In another embodiment, the email contains the text of the inquiries.

In another embodiment, the notification is sent by an email, or message on a social network such as Facebook® or Instant message system. In another embodiment, the notification is sent from a web-based interface such as Jive®, or LinkedIn® or Google Docs®. The creator completes the inquiry by selecting one or more video files related to the first file in the opinion of the creator, and sends the response to the server using any of the notification methods described above.

Server 120 receives the response to the inquiry from the creator and processes the response. The response includes a selection of video files related to the first file. In an embodiment, the response includes a ranked list of the related video files, identifying the relevance of the related video files to the first file.

In an embodiment, video files selected by the creator are ranked higher than the video files not selected by the creator.

A subset of the ranked video files is selected. In another embodiment, all video files selected by the creator 130 are selected. In another embodiment, a certain number of ranked video files are selected. Server 120 creates a hyperlink between the first file and the subset of selected/ranked video files in the video file storage system. The hyperlink influences future search results of the engine when the first file or any of the subset of video files is involved. Server 120 stores information about the subset of related video files in a storage system 140. The information includes one or more of hyperlinks to the related video files, ranking of the video files, the creator of the first file, and metadata of the video files. In the described embodiments, hyperlinks are references to video files that connect the users to another video/file or a portion of the video file. In another embodiment, storage system 140 is a separate storage system. When a user selects (150) the video identifier from search results or any other listing, server 120 retrieves information about the selected/ranked related video files. In an embodiment, the user is presented with a list of information about the related video files as shown in FIG. 2. In one embodiment, the identity of the creators who selected each video file is revealed to the user by displaying meta-data such as the creator's name, address, or contact information.

Figure 3:
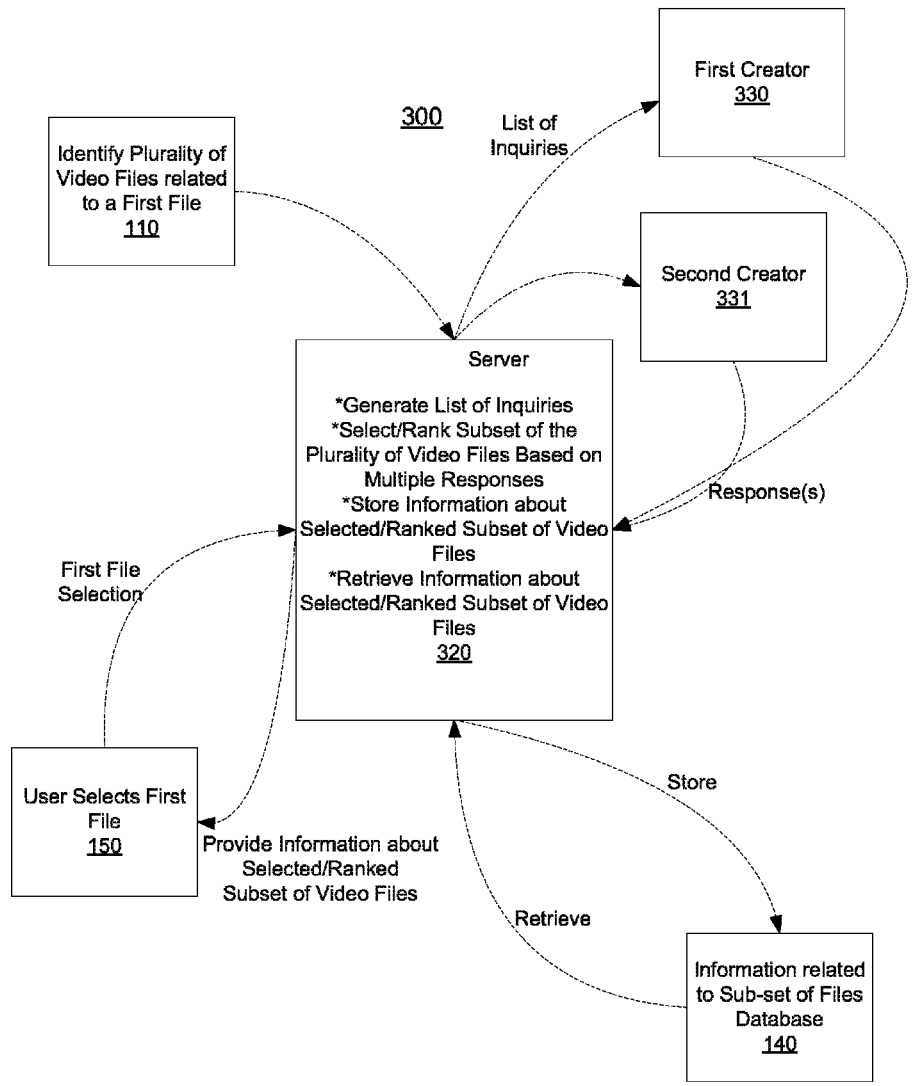
FIG. 3 is a block diagram of an embodiment of a system of providing related video files, where more than one creator provides input to selecting/ranking a subset of video files.

FIG. 3 is a block diagram of an embodiment of system 300, a system of providing related video files, where more than one creator provides input to selecting/ranking a subset of video files. A set of video files related to the first file 110 is identified in video file storage system by server 320. The set of video files is derived based on a relationship such as creator, frequently used noun-phrases, and common subject matter with the first file. Server 320 generates a list of inquiries based on the set of video files related to the first file. In an embodiment, the list of inquiries includes questions asking the creators whether the related video files are relevant to the first file as determined by the search engine.

The list of inquiries generated by server 320 is notified to the first creator 330. The list of inquiries is also notified to second creator 331. In the described embodiments, the second creator is one or more creators other than the first creator. The first and second creators are notified electronically as described in conjunction with FIG. 1. Server 320 receives responses from the first creator as well as the second creator. The response includes a selection of video files related to the first file. In an embodiment, the response includes a ranked list of the related video files, identifying the relevance of the related video files to the first file. In an embodiment, video files are ranked based on the number of selections from the first and the second creator. In an embodiment, the video files selected by the first creator are ranked higher than the video files selected by second creator. In another embodiment, all responses are ranked with the same weight. In another embodiment, a certain number of ranked video files are selected. In another embodiment, all video files selected by the first creator and the second creator are selected.

Information about the selected/ranked video files is stored in a video file storage system 140. User selection of the first file identifier 150 from search results or any other listing is sent to server 320. In an embodiment, server 320 retrieves information about the selected/ranked list of related video files from the video file storage system before presenting to the user. In one embodiment, the identity of the creators who selected each video file is revealed to the user by displaying meta-data such as the creator's name, address, or contact information.

Figure 4:
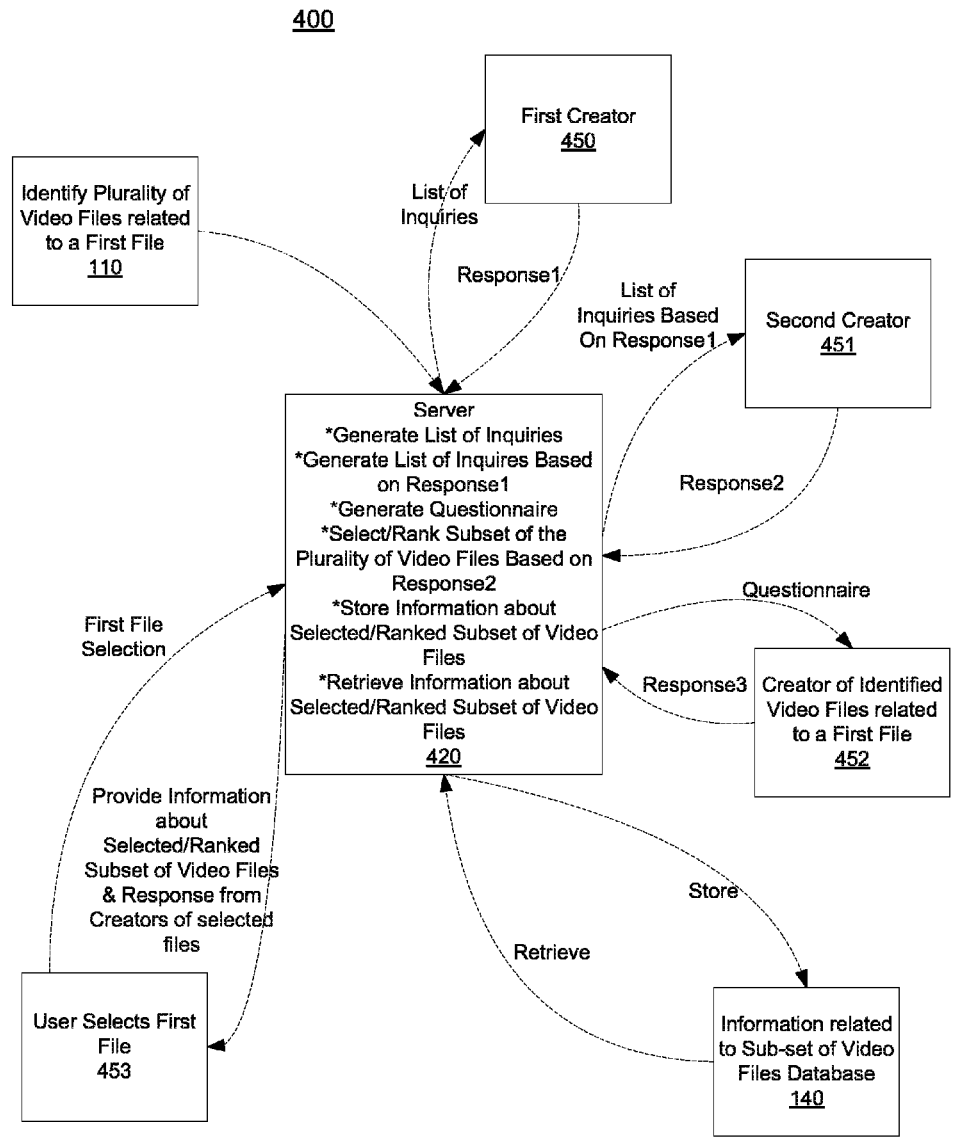
FIG. 4 is a block diagram of an embodiment of a system of providing related video files in a video file storage system, where more than one creator is involved in the selecting/ranking a subset of video files and more than one list of inquiries is generated.

FIG. 4 is a block diagram of an embodiment of system 400, a system of providing related video files, where more than one creator provides input to selecting/ranking a subset of video files and more than one list of inquiries is generated. One or more video files related to a first file are identified in a video file storage system (similar to the description in conjunction with FIG. 1). A list of inquiries is generated by server 420 based on the video files related to the first file. The list of inquiries includes questions asking the relevance of the related video file to the first file. The list of inquiries is notified to a first creator 450. A first response is received from first creator 450 by server 420. The first response includes selection of video files that are related to the first file in the opinion of the first creator 450. In an embodiment, the first response includes a ranked list of the related video files, identifying the relevance of the related video files to the first file. A second list of inquiries is generated based on the first response. The second list of inquiries includes questions about the selection of the video files related to the first file by the first creator. In an embodiment, the second list of inquiries includes the related video files and the search terms used to identify the related video file or the noun-phrases used to identify the video files.

Second creator 451 are notified electronically (by methods discussed in conjunction with FIG. 1) with the second list of inquiries. Server 420 receives the second response from second creator 451 and analyzes the second response. The second response further refines the machine generated search results. The second response includes a selection of video files related to the first file. In an embodiment, the second response includes a ranked list of the related video files, identifying the relevance of the related video files to the first file. Server 420 ranks a related video file based on the number of selections from second creator. A subset of the ranked related video files is selected. In an embodiment, all video files selected by second creator 451 are selected. In another embodiment, related video files receiving a certain rank are selected.

In an embodiment, server 420 generates a questionnaire based on identified video files related to the first file 110. The questionnaire includes the opinion of one or more creators of the identified video file about the selection as a related video file to the first file. The questionnaire is notified to the creators of identified video files 452. Server 420 receives response 3 from the creators of identified video files 452. In an embodiment, server 420 ranks an identified web page based on the number of selections from second creator 451 and the selection from the creator of identified video files 452. A subset of the ranked related video files is selected.

In an embodiment, all video files selected by second creator are selected for ranking. In another embodiment, related video files receiving a certain rank are selected. Information related to the selected/ranked video files is stored in video file storage system 140. In an embodiment, the information related to the selected/ranked video files includes one or more of hyperlink to the selected video file, the creator of the selected video file, the title of the selected video file, the creators, the opinion of the creator of the selected video file, opinion of the creators of the first file, institution of the creator, the published date, and the selection/rank date. When a user selects the first file, identifier 453, server 420 retrieves the information related to the selected related video files from storage system 140. In several embodiments, information related to the subset of selected/ranked video files is presented to the user as shown in FIG. 2. In one embodiment, the identity of the creators who selected each video file is presented to the user by displaying meta-data such as the creator's name, qualifications, institution, affiliation, address, or contact information. In another embodiment, information about the opinion of the creator of the selected video file is presented to the user.

Figure 5:
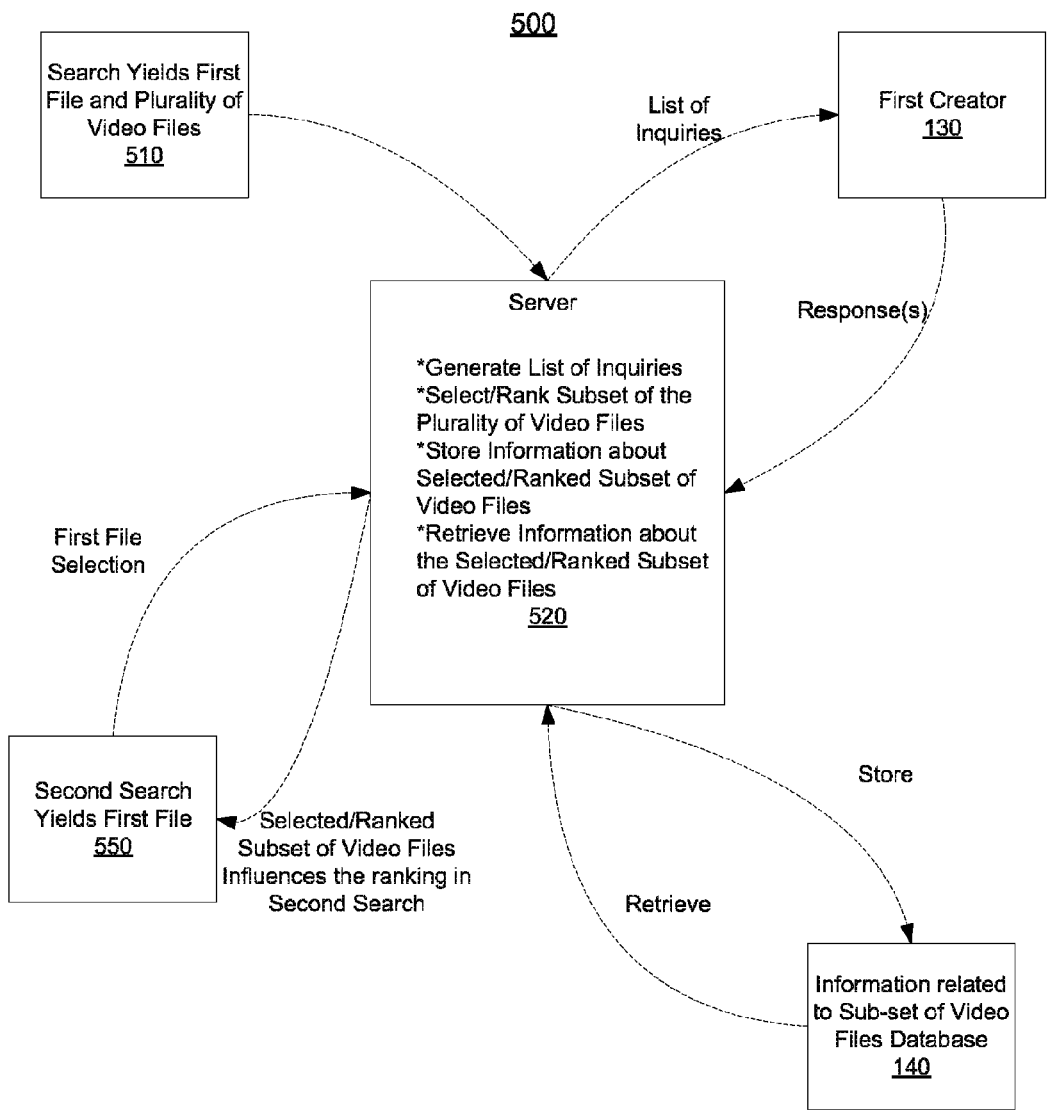
FIG. 5 is a block diagram of an embodiment of a system of providing related video files, where a creator provides input to selecting/ranking a subset of video files, where a search yields a first file.

FIG. 5 is a block diagram of system 500, an embodiment of a system of providing related video file, where a creator is involved in the selecting/ranking a subset of video files, where a search yields a first file. Server 520 searches for a first file in the video file storage system. The search engine outputs a list of video files 510 related to the first file based on search techniques described in conjunction with FIG. 1. Server 520 generates a list of inquiries based on the list of related video files. The list of inquiries includes questions whether each of the video files from search results are relevant to the first file.

The list of inquiries is notified to first creator 130. A response is received from the creator. The response includes a selection of video files related to the first file and optionally the reason for relevancy in the creator's opinion. In an embodiment, the response includes a ranked list of the related video files, identifying the relevance of the related video files to the first file. Server 520 ranks the related video files based on the response from the creator. A subset of the ranked related video files is selected. Server 520 stores information about the subset of selected/ranked videos in a storage system 140. When a second search yields a plurality of search results containing the information identifying first file 550, server 520, retrieves the stored information about the subset of selected/ranked video files and influences the ranking of the first file relative the search results when presenting the search results to the user. In one embodiment, the identity of the creators who selected each video file is revealed to the user by displaying meta-data such as the creator's name, address, or contact information.

Methods

Figure 6:
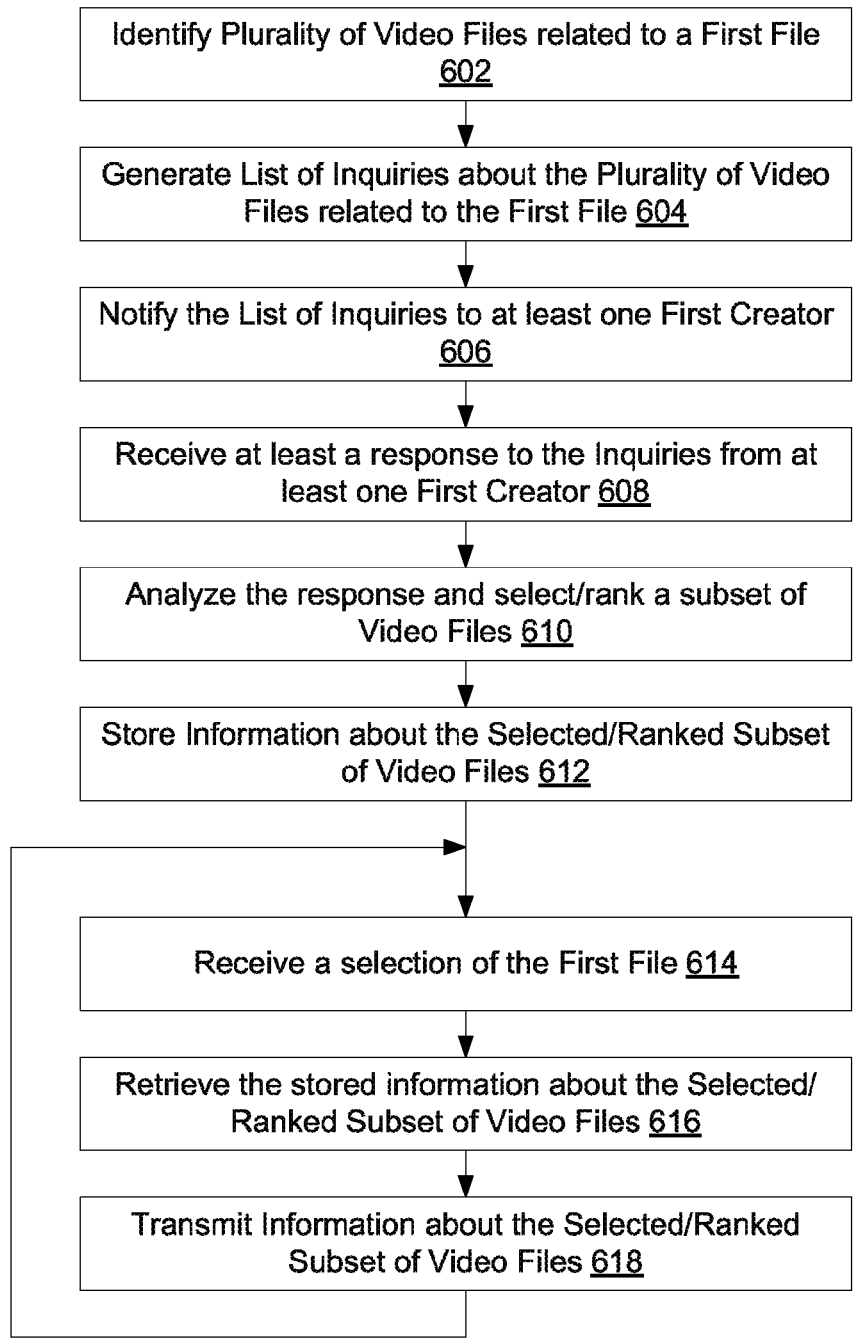
FIG. 6 is a flowchart that includes the steps of an example of a method of providing related video files in a video file storage system, where one or more creators provide input to selecting/ranking a subset of video files.

FIG. 6 is a flowchart that includes the steps of an example of a method of providing related video files, where a creator is involved in the selecting/ranking a subset of video files. In step 602, transcript or meta-data of the video files in the video file storage system is searched to identify one or more video files that are related to a first file. In several embodiments, the search is based on any of or all of natural language search, machine language search, text analysis, or collaborative filtering. In an embodiment, the video file storage system is searched for keywords that are automatically generated by the server. The keywords may be the creator/creators of the first file, frequently appearing words, creators of cited references in the first file, noun phrases based on subject matter, and subject. In an embodiment, the search is conducted on the full-text of the transcript or meta-data. In another embodiment, only the titles are searched. In an embodiment, only video files created after the first file are searched. In embodiment, the algorithm used to generate the search terms using Google Data® API on Youtube® automatically extracts noun phrases from the first file using natural language processing tools and ranks them by the number of occurrences in the video file meta-data compared to the number of occurrences on the video file storage system.

In step 604, the server automatically generates a list of inquires based on the search results of step 602 to access the relevancy of the search result. The list of inquiries includes questions about each related video file. In an embodiment, inquiries list the subject of one or more video files identified in the search, the date created, and the search terms used to identify the video file. Other embodiments may not list all the above items. FIG. 2 shows an example of the list of inquiries presented to creators. In step 606, the list of inquiries is notified to at least one creator of the first file. In the described embodiments, the notification can be sent electronically by an email, or message on a social network or instant message. Web based interface is another method of notifying the creator.

In step 608, method 600 receives at least one response to the list of inquiries from the creators. The response includes a selection whether any of the video files are relevant to the first file. In an embodiment, if any of the video files are relevant, a selection of the relevant video file and optionally the reason for the video file being relevant are presented to the server. In an embodiment, the response includes a list of the related video files, identifying the relevance of the related video files to the first file. In step 610, method 600 analyzes the responses from the creators. The related video files are ranked based on the number of selections received from the creators. A subset of the ranked related video files is selected. In an embodiment, all video files selected by the creators are selected. In another embodiment, a certain number of ranked video files are selected. In another embodiment, video files receiving certain rank are selected. Method 600 creates a hyperlink between the first file and the selected/ranked subset of video files. The hyperlink can influence the search results in the video file storage system when the first file is involved. In step 612, information about the selected/ranked video files related to the first file is stored. The information about the selected/ranked video files includes at least one of hyperlinks to the video files in the video file storage system, the rank of each video file in the selected subset, metadata of the video files. The information may be stored on the video file storage system or any other storage system.

Steps 602-612 are performed to generate a list of selected/ranked video files that may be more relevant than the machine generated references. In an embodiment, steps 602-612 are performed once. In another embodiment, steps 602-612 are performed at certain fixed intervals.

In another embodiment, events such as addition of a certain number of video files or a manual intervention may trigger steps 602-612. In step 614, method 600 receives a selection of the first file identifier or information about the first file from a user. The video file or information about the video file may be selected from search results or from a list of video files. The server retrieves the stored information about the selected/ranked video files in step 616. In several embodiments, information about the related video files is displayed to the user in step 618 shown in FIG. 2. In one embodiment, the identity of the creators who selected each video file is revealed to the user by displaying meta-data such as the creator's name, email address, and contact information. Steps 614-618 are performed when a user selects the first file for display. In an embodiment, each of the steps of method 600 may be a distinct step. In other embodiments, method 600 may not have all of the above steps and/or may have other steps in addition to or instead of those listed above. The steps of method 600 may be performed in another order.

Subsets of the steps listed above as part of method 600 may be used to form their own method. In an embodiment, there could be multiple instances of method 600.

Figure 7:
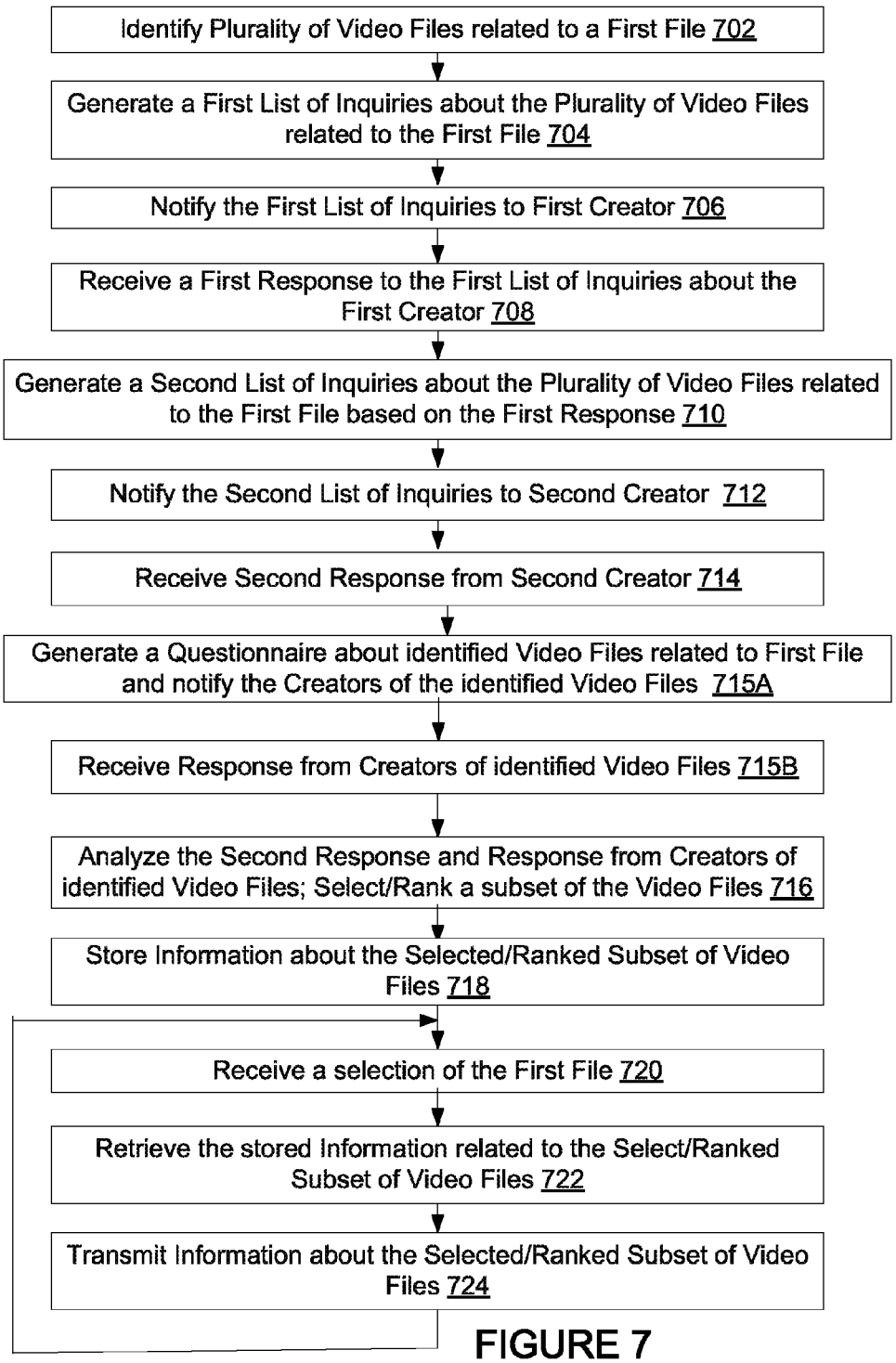
FIG. 7 is a flowchart that includes the steps of an example of a method of providing related videos in a network, where more than one list of inquiries is generated and more than one creator is involved in the selecting/ranking a subset of video files.

FIG. 7 is an example of a flowchart that includes the steps of method 700 of providing a list of related video files, where more than one list of inquiries is generated and more than one creator is involved in the selecting/ranking a subset of video files. In this method, at least two distinct lists of inquiries are generated, the first list of inquiries is sent to the first creator and the second list of inquiries is sent to the other creators. The second list of inquiries is generated based on the response from the first creator. In method 700, a set of one or more video files related to a first file is identified in step 702. In step 704, a first list of inquiries about the set of video files identified in step 702 is generated. The first list of inquiries includes questions whether each of the identified video files are related to the first file and optionally why they are related. In the described embodiment, steps 702 and 704 are similar to steps 602 and 604 respectively. The first list of inquiries is notified to a first creator of the first file in step 706. A first response to the first list of inquiries is received in step 708. The response includes a selection of video files related to the first file and optionally the reason for the selection. In step 710, a second list of inquires based on the response from the first creator about the relevance of the set of video files to the first file is generated. In an embodiment, the second list of inquiries includes a list of video files selected by the first creator for selecting video files related to the first file. In an embodiment, the second list of inquires includes questions whether the second creator agrees with the first creator. In another embodiment, the second list of inquiries includes the reason for a video file being relevant to the first file.

One or more second creator of the first file are notified with the second list of inquiries in step 712. In step 714, one or more second response is received from the second creator. In an embodiment, a questionnaire is generated based on the list of identified video files in step 715A. The questionnaire includes whether the identified video files are related to the first file. The questionnaire is notified to one or more creators of the plurality of identified video files.

In step 715B, server 520 receives response from one or more creators of the plurality of identified video files. In step 716, the second response from the second creator is analyzed. In an embodiment, video files are ranked based on the number of selections from the second creator. In another embodiment, video files are ranked based on the response from creators of identified video files in addition to the response from second creator. In an embodiment, the response includes identifying the relevance of the related web pages to the first file. In an embodiment, the response includes identifying the relevance of the related video files to the first file. A subset of the ranked video files is selected. In an embodiment, all video files selected by the second creator are selected. In another embodiment, a certain number of ranked video files or video files with a certain rank are selected. Method 700 creates a hyperlink between the first file and the selected/ranked subset of video files. The hyperlink can influence the search results in the video file storage system when the first file is involved. In step 718, information about the selected/ranked subset of video files related to the first file is stored in a video file storage system. Steps 702-718 are performed to generate a list of selected/ranked video files that may be more relevant than the machine generated referenced. In an embodiment, steps 702-718 are performed once. In another embodiment, steps 702-718 are performed at certain fixed intervals.

In another embodiment, events such as addition of a certain number of video files or a manual intervention may trigger steps 702-718.

In step 720, the server receives a selection of the first file identifier. Information about the related video files of the first file stored in a storage system is retrieved in step 722. Information about the list of related video files is presented to the user in step 724. Steps 720-724 are performed when a user selects the first file for display. Steps 718, 720, 722, and 724 are similar to steps 612, 614, 616, and 618 respectively. In an embodiment, each of the steps of method 700 may be a distinct step. In other embodiments, method 700 may not have all of the above steps and/or may have other steps in addition to or instead of those listed above. The steps of method 700 may be performed in another order. Subsets of the steps listed above as part of method 700 may be used to form their own method. In an embodiment, there could be multiple instances of method 700.

Figure 8:
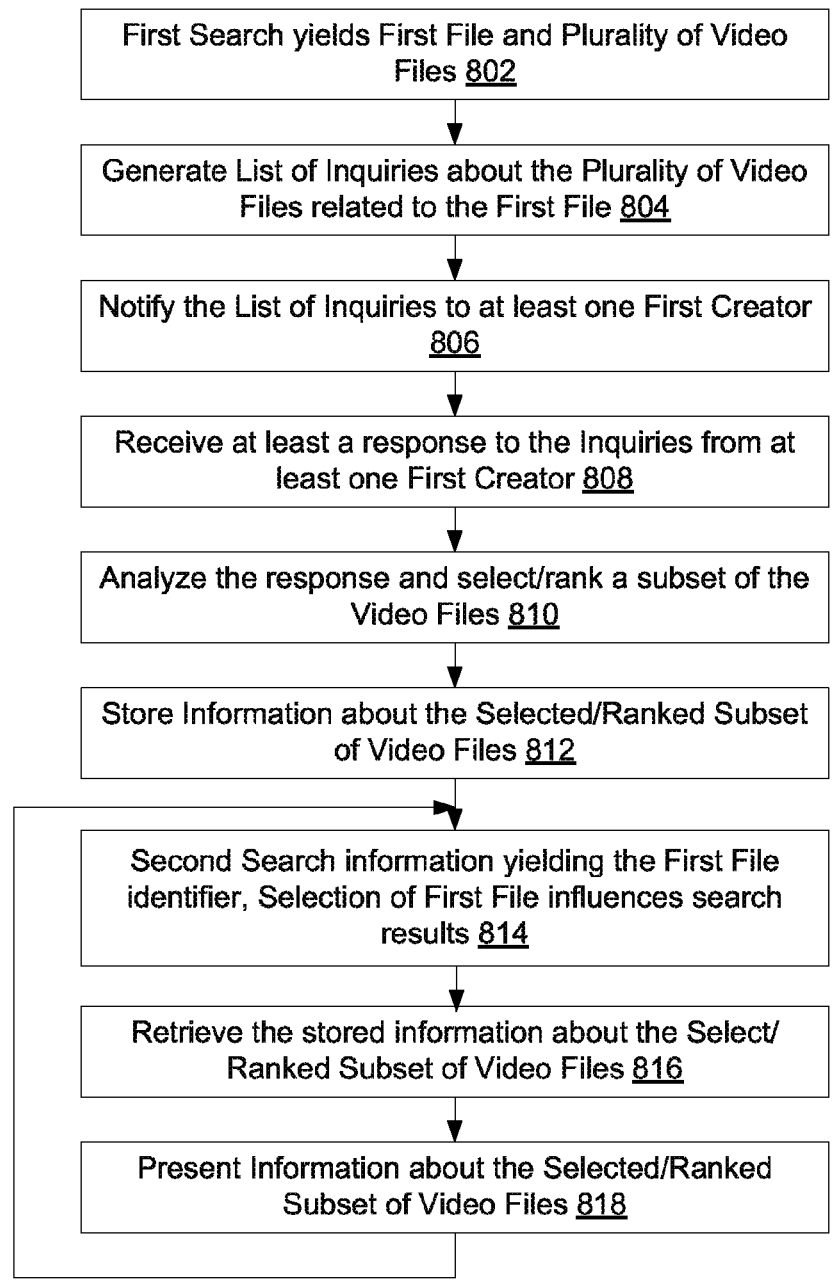
FIG. 8 is a flowchart of an example of a method of providing a list of related video files, where a creator is involved in the selecting/ranking a subset of video files, where a search yields a first file.

FIG. 8 is an example flowchart of method 800 of providing a list of related video files, where a creator provides input to selecting/ranking a subset of video files, and a search yields a first file. A first search in the video file storage system using a search engine provides a list of video files related to the first file in step 802. In embodiment, the algorithm used to generate the search terms using Google Data® API automatically extracts noun phrases from the first file meta-data using natural language processing tools and ranking them by the number of occurrences in the video file meta-data compared to the number of occurrences in the video file storage system. A list of inquiries is generated based on the video files related to the first file in step 804. The list of inquiries includes whether each video file listed as related video from the search results is related to the first file and optionally the reason for being related.

In step 806, the list of inquiries is notified to one or more creators. In step 808, method 800, receives at least one response from the creators providing information about the relevancy of related video files to the first file and optionally the reason for a video file being related in the opinion of the creator. In step 810, the related video files are ranked based on the number of selections from the creators. In an embodiment, the response includes a ranked list of the related video files, identifying the relevance of the related video files to the first file. A subset of the ranked video files is selected. Information related to the subset of video files is stored in a storage system in step 812. Method 800 creates a hyperlink between the first file and the selected/ranked subset of video files. The hyperlink can influence the search results in the video file storage system when the first file is involved. Steps 804, 806, 808, 810, and 812 may be similar to steps 604, 606, 608, 610 and 612. Steps 802-812 are performed to generate a list of selected/ranked video files that may be more relevant than the machine generated referenced. In an embodiment, steps 802-812 are performed once. In another embodiment, steps 802-812 are performed at certain fixed intervals. In another embodiment, events such as addition of a certain number of video files or a manual intervention may trigger steps 802-812.

A second search in the video file storage system using a search engine yields a first file and the server receives a selection of the first file identifier in step 814. The selection of the first file can influence the search results of future searches. The server retrieves information about the related video files (stored in step 812) from the storage system in step 816. In several embodiments, in step 818, information about the related video files is presented to the user shown in FIG. 2. In one embodiment, the identity of the creators who selected each video file is revealed to the user by displaying meta-data such as the creator's name, address, or contact information. Steps 814, 816, and 818 may be similar to steps 614, 616 and 618. Steps 814, 816, and 818 are repeated for every search yielding the first file. In an embodiment, each of the steps of method 800 may be a distinct step. In other embodiments, method 800 may not have all of the above steps and/or may have other steps in addition to or instead of those listed above. The steps of method 800 may be performed in another order. Subsets of the steps listed above as part of method 800 may be used to form their own method. In an embodiment, there could be multiple instances of method 800.

Identifying Related Video Files

One or more video files related to a first file in the video file storage system are identified by server 120 or server 320 or server 420. In the described embodiments, the first file can reside in a creator system 922, or in the video file storage system 920 or in server system 902. The related video files are identified by natural language search, or text analysis, or from collaborative filtering, or any other search techniques. In an embodiment, server 120 or 320 or 420 extracts noun phrases from video files in the video file storage system using natural language processing tools and ranks them by the number of occurrences in the video file compared to the number of occurrences in the video file storage system. In one embodiment, server 520 searches the video file storage system uses Google Data® API to automatically extract noun phrases from video file meta-data in Youtube® using natural language processing tools and rank them by the number of occurrences in the meta-data compared to the number of occurrences in the video file storage system.

Generation of List of Inquiries

In an embodiment, the list of inquiries generated by the system server includes one or more identified video files related to a first file. In an embodiment, the inquiries include the search terms used in a search using text analysis or collaborative filtering. In another embodiment, the list of inquires includes one or more identified video files and the noun-phrases from the first file used to identify the video files. In an embodiment, the list of inquiries presented to the first creator includes one or more subjects of related of video files, the search term used to identify the related video files, the noun-phrases which are validated by their presence in the hyperlinks from the first file, the date created, the abstract and the unique identification. The list of inquiries for second creator is influenced by a response received from a first creator. The list of inquiries to second creator includes one or more of the selection of related video files by the first creator, the search terms used to identify the related video file, the noun-phases used in citation-validation techniques and the date created. In an embodiment, the list of inquiries includes one or more of the types of relationship tags of the identified video file such as whether the identified video file summarizes the first file, contradicts the first file, or complements the first file. In an embodiment, a questionnaire is generated to the creators of the identified video files. The questionnaire may contain questions whether the identified video file is related to the first file. The list of inquires is notified electronically to one or more creators. The notification comprises at least one of an email, messaging on a social network, instant video or a web-based interface notification.

Selection and Ranking of Related Video Files

The related video files are ranked based on the number of selections from the creators. In an embodiment, a selection of the related video file from each creator is ranked equally. In another embodiment, selection of a video file from the first creator receives higher ranking. In another embodiment, selection of a video file from a creator who responds to queries more often is ranked higher. In another embodiment, selection by the creator of the identified video files is ranked higher. In another embodiment, selection of a video file by the creator of the first file and creator of the video file is ranked highest. A subset of the related video files is selected. In an embodiment, all video files selected by the creators are selected. In another embodiment, a certain number of the ranked video files are selected. In another embodiment, video files receiving a certain rank are selected.

In an embodiment of a method of identifying video files of a video file storage system having relevance to a first file, comprising identifying a plurality of video files within the video file storage system, wherein the plurality of video files each have a relationship with the first file; generating, by a system server, a list of inquiries based on the plurality of video files; providing, by the system server, the list of inquiries to at least one creator of the first file; receiving from the at least one creator at least one response to the list of inquiries; selecting a subset of the plurality of video files based on the at least one response; storing information related to the selected subset of the plurality of video files for access if the first file is selected. In an embodiment of a method wherein the at least one creator comprises at least one author of the first file. In an embodiment of a method further comprising generating, by the system server, a second list of inquiries based on the plurality of video files; providing, by the system server, the second list of inquiries to at least one second creator of the plurality of video files; receiving from the at least one second creator of the plurality of video files at least one second response to the second list of inquiries; re-selecting the subset of the plurality of video files based on the at least one response and the at least one second response; storing information related to the re-selected subset of the plurality of video files for access if the first file is selected. In an embodiment of a method further comprising providing, by the system server, the selected subset of the plurality of video files to a user that selects the first file and identifying the at least one creator to the user.

In an embodiment of a method wherein identifying the at least one creator comprises providing the user with the at least one creator's name, qualifications, institution, affiliation, address, or contact information. An embodiment of a method further comprising providing, by the system server, the selected subset of the plurality of video files to a user that selects the first file and identifying the at least one creator of the first file, and the at least one creator of the plurality of video files to the user, wherein identifying the at least one creator comprises providing the user with the at one of a name, qualifications, institution, affiliation, address, or contact information of the at least one creator shown in FIG. 2. An embodiment of a method further comprising providing a hyperlink between the first file and the selected subset of the plurality of video files, wherein the hyperlink influences a ranking of search results that include at least one of the first file and the plurality of video files.

An embodiment of a method wherein the plurality of video files are each identified by a plurality of video object searches, wherein each search identifies one of the plurality of video files and the first file. An embodiment of a method wherein at least one of the plurality of video object searches is refined by the at least one response. An embodiment of a method wherein at least one of the plurality of video object searches uses a keyword search application programming interface to access video files in the video file storage system. An embodiment of a method wherein the list of inquiries includes search terms used in a search that identified the first file and the plurality of video files, thereby establishing a relationship between the first file and the plurality of video files by text analysis or collaborative filtering. An embodiment of a method wherein the search terms comprise strings of words. An embodiment of a method wherein the search terms comprise noun phrases. An embodiment of a method wherein the search terms comprise creator names cited by the first file. An embodiment of a method wherein the search terms comprise a term within the first file. An embodiment of a method the search is based on at least one of a word string, a creator, or an image. An embodiment of a method wherein the search terms are included within text of citations of the first file.

An embodiment of a method wherein each of the plurality of video files includes a publication date, and wherein each of the publication dates is more recent than at least one of a first revision or a last revision date of the first file. An embodiment of a method wherein each of the plurality of video files includes a publication date, and wherein each of the publication dates comprise a specific date. An embodiment of a method wherein each of the plurality of video files includes a publication date, and wherein each of the publication dates comprise a date before a specific date. An embodiment of a method wherein the list of inquiries includes titles of at least a subset of the plurality of video files. An embodiment of a method wherein the list of inquiries includes creators of at least a subset of the plurality of video files.

An embodiment of a method wherein the at least one creator includes a first creator and a second creator, and wherein the list of inquiries for the first creator is influenced by a response received from the second creator. An embodiment of a method wherein the list of inquiries includes a relationship tag between at least one of the plurality of video files and the first file. An embodiment of a method where in the relationship tag comprises at least one question of whether the relationship of the at least one the plurality of video files to the first file is supportive, contradictory or summarizing. An embodiment of a method wherein providing the list of inquiries to the at least one creator of the first file comprises electronically communicating the list of inquires to the at least one creator using a notification. An embodiment of a method wherein the notification comprises at least one of an email, messaging on a social network, or instant message. An embodiment of a method wherein the notification comprises a web-based interface notification. An embodiment of a method wherein receiving from the at least one creator at least one response to the list of inquiries comprises receiving a selected subset of the plurality of video files that the at least one creator selects as being relevant to the first file.

An embodiment of a method wherein receiving from the at least one creator at least one response to the list of inquiries comprises receiving a ranked list of at least a subset of the plurality of video files that identifies an order of relevance of the at least the subset of the plurality of video files to the first file. An embodiment of a method further comprising providing the at least one inquiry based on one response to at least one other creator, receiving from the at least one other creator at least one second response to the at least one response; re-selecting the subset of the plurality of video files based on the at least one second response; storing information related to the re-selected subset of the plurality of video files for access if the first file is selected. An embodiment of a method wherein the list of inquiries is provided to a plurality of creators, and responses received from each of the plurality of creators are compiled for selecting the subset of the plurality of video files. An embodiment of a method wherein a plurality of lists of inquiries are provided to a plurality of creators, and responses received from each of the plurality of creators are compiled for selecting the subset of the plurality of video files. An embodiment of a method further comprising the at least one creator having a permission to edit the first file. An embodiment of a method for a server to identify video files having relevance to a first file, comprising receiving, by the server, a plurality of video files, wherein the plurality of video files were generated by a subject matter search; generating, by the server, a list of inquiries based on the plurality of video files; providing, by the server, the list of inquiries to a creator of the first file, wherein the first file is a one of the plurality of video files; receiving, by the server, from the creator at least one response to the list of inquiries; selecting, by the server, a subset of the plurality of video files based on the at least one response; storing, by the server, the selected subset of the plurality of video files for access if the first file is selected.

An embodiment of a method further comprising providing, by the server, the selected subset of the plurality of video files to a user that selects the first file. An embodiment of a system for identifying video files having relevance to a first file, comprising a server configured to present on a first display a list of inquiries to an identified creator of a first file, wherein the list of inquiries is based on a plurality of video files; the server configured to receive from the identified creator at least one response to the list of inquiries; the server configured to select a subset of the plurality of video files based on the at least one response; a server configured to present on a second display the selected subset of the plurality of video files to a user that selects the first file. An embodiment of a programmable storage device readable by a machine, tangibly embodying a program of instructions when executed by the machine to perform a method of identifying video files of a video file storage system having relevance to a first file, the method comprising identifying a plurality of video files within the video file storage system, wherein the plurality of video files each have a relationship with the first file; generating, by a system server, a list of inquiries based on the plurality of video files; providing, by the system server, the list of inquiries to at least one creator of the first file; receiving from the at least one creator at least one response to the list of inquiries; selecting a subset of the plurality of video files based on the at least one response; storing information related to the selected subset of the plurality of video files for access if the first file is selected.

An embodiment of a method of identifying video files of a video file storage system having relevance to a first file, comprising identifying a plurality of video files within the video file storage system, wherein the plurality of video files each have a relationship with the first file; generating, by a system server, a first list of inquiries based on the plurality of video files; providing, by the system server, the first list of inquiries to at least one creator of the first file; receiving from the at least one creator of the plurality of video files at least one first response to the first list of inquiries; generating, by the system server, a second list of inquiries based on the plurality of video files; providing, by the system server, the second list of inquiries to at least one second creator of the plurality of video files; receiving from the at least one second creator of the plurality of video files at least one second response to the second list of inquiries; selecting a subset of the plurality of video files based on the at least one first response and the at least one second response; storing information related to the selected subset of the plurality of video files for access if the first file is selected. An embodiment of a method wherein the at least one creator comprises at least one creator of one of the plurality of video files. An embodiment of a method wherein the information related to the selected subset of the plurality of video files comprises an opinion of the at least one creator of either the first file or the plurality of video files. An embodiment of a method further comprises providing the opinion of the at least one creator to a user that selects the first file.

System

Figure 9:
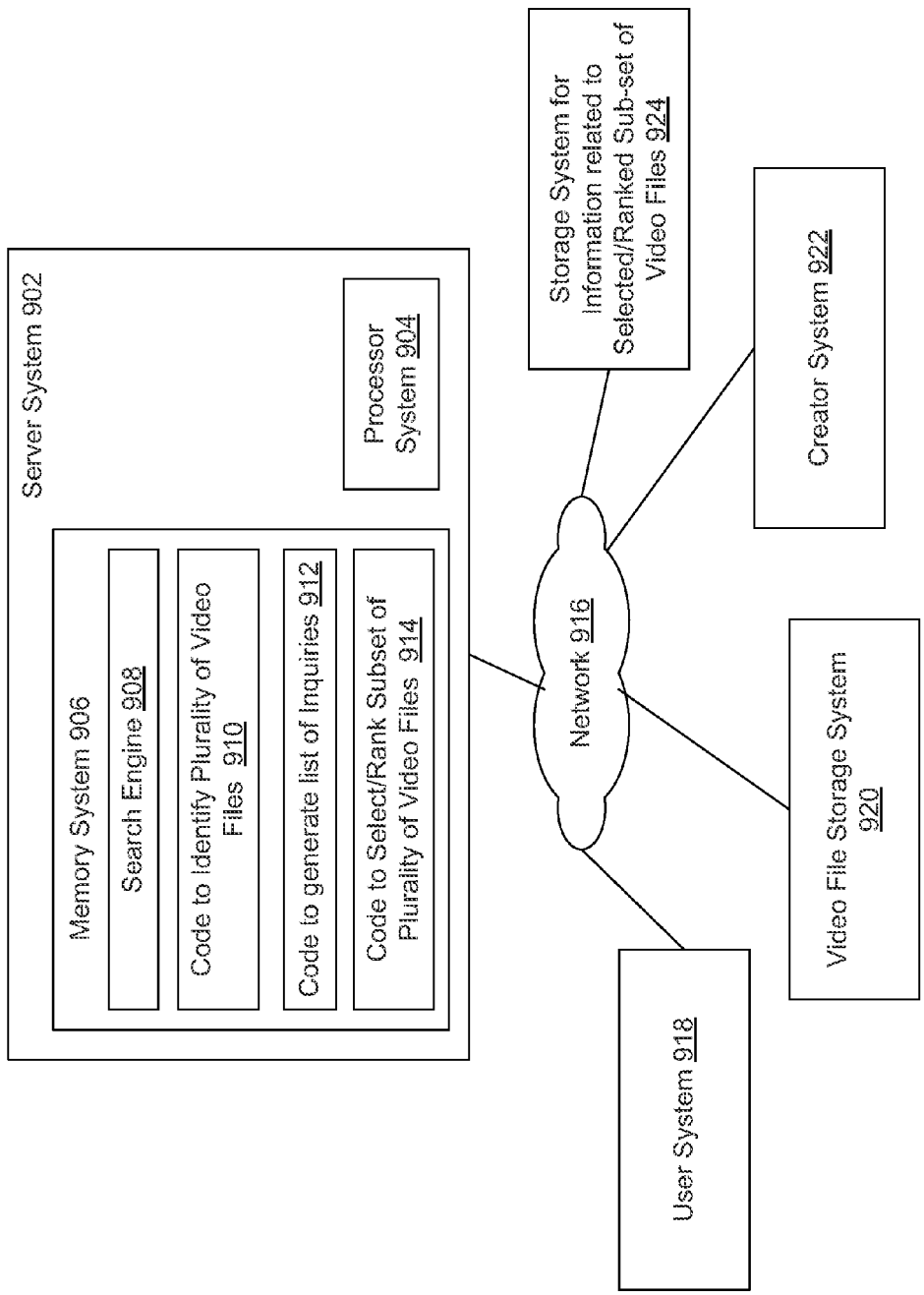
FIG. 9 shows an example of a block diagram of a system of providing related video files to a search result in a video file storage system.

FIG. 9 shows a block diagram of system 900, an embodiment of a system of providing related video files to a search result. The system consists of server system 902, network 916, user system 918, video file storage system 920, creator system 922, and storage system for information related to selected/ranked subset of video files 924 among others. In other embodiments, system 900 may not have all of the elements or features listed and/or may have other elements or features instead of or in addition to those listed.

As shown in FIG. 9, for the described embodiments, server system 902 includes processor system 904 and memory system 906 among others. Server system 902 consists of one or more servers connected to the network. Server system 902 can be a single unit, distributed in various locations, or virtualized. Processor system 904 may include any one of, some of, any combination of, or all of multiple parallel processors, a single processor, a system of processors having one or more central processors and/or one or more specialized processors dedicated to specific tasks. Also, processor system 904 may include one or more Digital Signal Processors (DSPs) in addition to or in place of one or more Central Processing Units (CPUs) and/or may have one or more digital signal processing programs that run on one or more CPU.

Memory system 906 may include, for example, any one of, some of, any combination of, or all of a long-term storage system, such as a hard drive; a short-term storage system, such as random access memory; a removable storage system, such as a floppy drive or a removable drive; and/or flash memory. Memory system 906 may include one or more machine-readable mediums that may store a variety of different types of information. The term machine-readable medium is used to refer to any medium capable carrying information that is readable by a machine. One example of a machine-readable medium is a computer-readable medium.

In an embodiment, memory system 906 stores code for search engine 908, code to identify plurality of video files 910, code to generate a list of inquiries/questionnaire 912, and code to select/rank subset of plurality of video files 914. Memory system 906 stores code for the search engine 906 to search the video file storage system for video files related to a first file and returns the result to server system 902. In the described embodiments, the first file can reside in the video file storage system 920, or creator system 922, or storage system for information related to selected/ranked subset of video files 924 or memory system 906 or any other storage system. In an embodiment, the search engine searches the abstract of the transcript or the title of the transcript. In another embodiment, the search engine searches the entire transcript for keywords. The results from the search engine are ranked in order of relevancy. The relevancy may be the number of times the keyword appears in the transcript, and the number of hyperlinks.

The keywords for searching related video files are supplied by the code to identify plurality of video files 910. The keywords may be all of or some of frequently used noun phrases, the creator of the first file, the creators listed in the references cited in the first file, words from the title, date created, words related to subject matter. Once the server receives the list of video files related to the first file, an inquiry is automatically generated by code to generate a list of inquiries 912 and sent to one or more creators. The list of inquiries is based on the search results. The inquiries include the relevancy of each of video files listed as a related video file to the first file, the reason for the video file being related to the first file. Code to select/rank subset of plurality of video files 914, selects a subset of the video files from search results, stores information about the selected subset of video files, and provides a hyperlink between the first file and the selected subset of video files. Selection of video files may also include ranking the video files based on the number of selection from the creators. In an embodiment, responses from different creators can have different weight. Information related to the selected/ranked subset of video files is stored. In an embodiment, the information related to the selected/ranked subset of video files is stored on a storage system for information related to selected/ranked subset of video files 924. In another embodiment, the information related to the selected/ranked subset of video files is stored in memory system 906. In another embodiment, the information related to the selected/ranked subset of video files is stored in the video file storage system. In an embodiment, a hyperlink is created between the first file and the selected subset of video files. The hyperlink influences the ranking of search results by the search engine when the first file is involved.

Network 916 is a network and/or combination of networks of devices that communicate with one another within an enterprise or on the Internet. User system 918 is a user device connected to the network 916. User system 918 selects a video file from the video file storage system. The video file is selected from a search result or from a listing of video files. Video file storage system 920 is a shared storage system. All users can access the video file storage system to read and in some cases contribute to the video file storage system. Creator system 922 is a user system in the network. The creator system has read and write access to video files in the video file storage system. A creator of a video file may be a producer of the video file, the director of the video file, the transcript creator, the narrator, co-creator of the file, an expert in the subject matter or a team member.

An embodiment includes a programmable storage device (such as memory system 906) readable by a machine (such as, processor system 904), tangibly embodying a program of instructions when executed by the machine to perform a method of identifying files of a collaborative file storage system having relevance to a first file. The method includes identifying a plurality of video files within the video file storage system, wherein the plurality of video files each have a relationship with the first file, wherein the video file storage system provides a platform for storing and sharing videos, and each video file includes a video and associated information. The method further includes generating, by a system server, a list of inquiries based on the plurality of video files, providing, by the system server, the list of inquiries to at least one creator of the first file, receiving from the at least one creator at least one response to the list of inquiries, selecting a subset of the plurality of video files based on the at least one response, and storing information related to the selected subset of the plurality of video files for access if the first file is selected.

Although specific embodiments have been described and illustrated, the described embodiments are not to be limited to the specific forms or arrangements of parts so described and illustrated.

The Invention claimed is:

1. A method of identifying video files of a video file storage system having relevance to a first file, comprising:
    identifying a plurality of video files within the video file storage system, wherein the plurality of video files each have a relationship with the first file, wherein the video file storage system provides a platform for storing and sharing videos, and each video file includes a video and associated information;
    generating, by a system server, a list of inquiries based on the plurality of video files;
    providing, by the system server, the list of inquiries to at least one creator of the first file, wherein the list of inquiries includes search terms used in a search that identified the plurality of video files;
    receiving from the at least one creator at least one response to the list of inquiries;
    selecting a subset of the plurality of video files based on the at least one response;
    storing information related to the selected subset of the plurality of video files for access if the first file is selected;

providing, by the system server, the selected subset of the plurality of video files to a user that selects the first file; and identifying the at least one creator to the user.

2. The method of claim 1, wherein the at least one creator comprises at least one author of the first file.

3. The method of claim 1, further comprising:
generating, by the system server, a second list of inquiries based on the plurality of video files;
providing, by the system server, the second list of inquiries to at least one second creator of the plurality of video files;
receiving from the at least one second creator of the plurality of video files at least one second response to the second list of inquiries;
re-selecting the subset of the plurality of video files based on the at least one response and the at least one second response;
storing information related to the re-selected subset of the plurality of video files for access if the first file is selected.

4. The method of claim 1, wherein identifying the at least one creator comprises providing the user with a name, qualifications, institution, affiliation, address, or contact information of the at least one creator.

5. The method of claim 1, further comprising:
identifying at least one creator of the plurality of video files to the user, wherein identifying the at least one creator comprises providing the user with a name, qualifications, institution, affiliation, address, or contact information of the at least one creator.

6. The method of claim 1, further comprising providing a hyperlink between the first file and the selected subset of the plurality of video files, wherein the hyperlink influences a ranking of search results that include at least one of the first file and the plurality of video files.

7. The method of claim 1, wherein the plurality of video files are each identified by a plurality of video object searches, wherein each search identifies one of the plurality of video files and the first file.

8. The method of claim 7, wherein at least one of the plurality of video object searches is refined by the at least one response.

9. The method of claim 7, wherein at least one of the plurality of video object searches uses a keyword search application programming interface to access video files in the video file storage system.

10. The method of claim 1, wherein the search terms comprise strings of words.

11. The method of claim 1, wherein the search terms comprise noun phrases.

12. The method of claim 1, wherein the search terms comprise creator names cited by the first file.

13. The method of claim 1, wherein the search terms comprise a term within the first file.

14. The method of claim 1, the search is based on at least one of a word string, a creator, or an image.

15. The method of claim 1, wherein the search terms are included within text of citations of the first file.

16. The method of claim 1, wherein each of the plurality of video files includes a publication date, and wherein each of the publication dates is more recent than at least one of a first revision or a last revision date of the first file.

17. The method of claim 1, wherein each of the plurality of video files includes a publication date, and wherein each of the publication dates comprise a specific date.

18. The method of claim 1, wherein each of the plurality of video files includes a publication date, and wherein each of the publication dates comprise a date before a specific date.

19. The method of claim 1, wherein the list of inquiries includes titles of at least a subset of the plurality of video files.

20. The method of claim 1, wherein the list of inquiries includes the at least one creator of at least a subset of the plurality of video files.

21. The method of claim 1, wherein the at least one creator includes a first creator and a second creator, and wherein the list of inquiries for the first creator is influenced by a response received from the second creator.

22. The method of claim 1, wherein the list of inquiries includes a relationship tag between at least one of the plurality of video files and the first file.

23. The method of claim 22, where in the relationship tag comprises at least one question of whether the relationship of the at least one the plurality of video files to the first file is supportive, contradictory or summarizing.

24. The method of claim 1, wherein providing the list of inquiries to the at least one creator of the first file comprises electronically communicating the list of inquires to the at least one creator using a notification.

25. The method of claim 24, wherein the notification comprises at least one of an email, messaging on a social network, or instant message.

26. The method of claim 24, wherein the notification comprises a web-based interface notification.

27. The method of claim 1, wherein receiving from the at least one creator at least one response to the list of inquiries comprises receiving a selected subset of the plurality of video files that the at least one creator selects as being relevant to the first file.

28. The method of claim 1, wherein receiving from the at least one creator at least one response to the list of inquiries comprises receiving a ranked list of at least a subset of the plurality of video files that identifies an order of relevance of the at least the subset of the plurality of video files to the first file.

29. The method of claim 1, further comprising:
providing the at least one inquiry based on one response to at least one other creator;
receiving from the at least one other creator at least one second response to the at least one response;
re-selecting the subset of the plurality of video files based on the at least one second response;
storing information related to the re-selected subset of the plurality of video files for access if the first file is selected.

30. The method of claim 1, wherein the list of inquiries is provided to a plurality of creators, and responses received from each of the plurality of creators are compiled for selecting the subset of the plurality of video files.

31. The method of claim 1, wherein a plurality of lists of inquiries are provided to a plurality of creators, and responses received from each of the plurality of creators are compiled for selecting the subset of the plurality of video files.

32. The method of claim 1, further comprising the at least one creator having a permission to edit the first file.

33. A method for a server to identify video files having relevance to a first file, comprising:
receiving, by the server, a plurality of video files, wherein the plurality of video files were generated by a subject matter search;
generating, by the server, a list of inquiries based on the plurality of video files, wherein the list of inquiries includes search terms used in the subject matter search that generated the plurality of video files;

providing, by the server, the list of inquiries to a creator of the first file, wherein the first file is a one of the plurality of video files;

receiving, by the server, from the creator at least one response to the list of inquiries;

selecting, by the server, a subset of the plurality of video files based on the at least one response;

storing, by the server, the selected subset of the plurality of video files for access if the first file is selected providing, by the system server, the selected subset of the plurality of video files to a user that selects the first file; and identifying the at least one creator to the user.

34. A system for identifying video files having relevance to a first file, comprising:

a server configured to present on a first display a list of inquiries to an identified creator of a first file, wherein the list of inquiries is based on a plurality of video files;

the server configured to receive from the identified creator at least one response to the list of inquiries, wherein the list of inquiries includes search terms used in a search that identified the plurality of video files;

the server configured to select a subset of the plurality of video files based on the at least one response;

a server configured to present on a second display the selected subset of the plurality of video files to a user that selects the first file, and to identify the at least one creator to the user.

35. A programmable storage device readable by a machine, tangibly embodying a program of instructions when executed by the machine to perform a method of identifying video files of a video file storage system having relevance to a first file, the method comprising:

identifying a plurality of video files within the video file storage system, wherein the plurality of video files each have a relationship with the first file, wherein the video file storage system provides a platform for storing and sharing videos, and each video file includes a video and associated information;

generating, by a system server, a list of inquiries based on the plurality of video files, wherein the list of inquiries includes search terms used in a search that identified the plurality of video files;

providing, by the system server, the list of inquiries to at least one creator of the first file;

receiving from the at least one creator at least one response to the list of inquiries;

selecting a subset of the plurality of video files based on the at least one response;

storing information related to the selected subset of the plurality of video files for access if the first file is selected;

providing, by the system server, the selected subset of the plurality of video files to a user that selects the first file; and identifying the at least one creator to the user.

36. A method of identifying video files of a video file storage system having relevance to a first file, comprising:

identifying a plurality of video files within the video file storage system, wherein the plurality of video files each have a relationship with the first file, wherein the video file storage system provides a platform for storing and sharing videos, and each video file includes a video and associated information;

generating, by a system server, a first list of inquiries based on the plurality of video files;

providing, by the system server, the first list of inquiries to at least one creator of the first file, wherein the list of inquiries includes search terms used in a search that identified the plurality of video files;

receiving from the at least one creator of the plurality of video files at least one first response to the first list of inquiries;

generating, by the system server, a second list of inquiries based on the plurality of video files;

providing, by the system server, the second list of inquiries to at least one second creator of the plurality of video files;

receiving from the at least one second creator of the plurality of video files at least one second response to the second list of inquiries;

selecting a subset of the plurality of video files based on the at least one first response and the at least one second response;

storing information related to the selected subset of the plurality of video files for access if the first file is selected;

providing, by the system server, the selected subset of the plurality of video files to a user that selects the first file; and identifying the at least one creator or the at least one second creator to the user.

37. The method of claim 36, wherein the at least one creator comprises at least one creator of one of the plurality of video files.

38. The method of claim 36, wherein the information related to the selected subset of the plurality of video files comprises an opinion of the at least one creator of either the first file or the plurality of video files.

39. The method of claim 36, further comprises providing the opinion of the at least one creator to a user that selects the first file.

* * * * *